United States Patent [19]

Laveran

[11] Patent Number: 5,649,516

[45] Date of Patent: Jul. 22, 1997

[54] DEVICE FOR CONTROLLING THE TEMPERATURE OF SUPERCHARGING AIR FOR A HEAT ENGINE

[75] Inventor: Jean-Louis Laveran, Asnieres, France

[73] Assignee: Valeo Thermique Moteur, Le Mesnil-Saint-Denis, France

[21] Appl. No.: 545,281

[22] Filed: Oct. 19, 1995

[30] Foreign Application Priority Data

Oct. 21, 1994 [FR] France .................. 94 12628

[51] Int. Cl.$^6$ ........................................ F02B 29/04
[52] U.S. Cl. ............................... 123/563; 251/94
[58] Field of Search ................ 60/599; 123/563; 251/89, 94

[56] References Cited

U.S. PATENT DOCUMENTS

| 3,712,282 | 1/1973 | Isley ...................... 123/563 |
| 4,513,729 | 4/1985 | Udd ....................... 123/563 |

FOREIGN PATENT DOCUMENTS

| 80983 | 6/1983 | European Pat. Off. ........... 60/599 |
| 602348 | 6/1994 | European Pat. Off. . |
| 1255956 | 12/1971 | United Kingdom ............. 123/563 |
| 2223272 | 4/1990 | United Kingdom ............. 123/563 |

*Primary Examiner*—Michael Koczo
*Attorney, Agent, or Firm*—Morgan & Finnegan, LLP

[57] ABSTRACT

A pivoting flap valve, controlled by a pneumatic main actuator or actuating jack through an engagement means or connecting piece and a lever coupled to the valve, controls the changeover between a state in which supercharging air is delivered to the engine through a cooling radiator and a state in which it is delivered directly, according to the temperature of the air. The control device includes, besides the main actuator, two auxiliary or safety actuators or release jacks, carrying thrust pieces which cooperate with the connecting piece, or stop block, so as to prevent the ram of the main actuator from being extended. The flap valve is therefore unable to be put in a position such that the supercharging air bypasses the cooling radiator. The two auxiliary actuators work in such a way as to hold the ram of the main actuator in its retracted position, firstly in the event of failure of the supply pressure in the working fluid for the actuators, and secondly when the supercharging air pressure exceeds a predetermined threshold value.

6 Claims, 4 Drawing Sheets

DEVICE FOR CONTROLLING THE TEMPERATURE OF SUPERCHARGING AIR FOR A HEAT ENGINE

FIELD OF THE INVENTION

This invention relates to control devices for controlling the temperature of supercharging air for a heat engine, especially the engine of a vehicle.

More particularly, it relates to a control device for controlling the temperature of supercharging air for a heat engine, especially the engine of a vehicle, having supercharging apparatus which includes cooling means, interposed between a supercharging air compressor and the air inlet of the engine, and changeover means comprising the control device, for directing a stream of air received from the compressor, selectively according to the temperature of the air, either to the cooling means or directly to the engine air inlet through a delivery duct, wherein the control device comprises a movable obturator and a resilient actuating element for urging the movable obturator towards a first position of the obturator, in which the compressor communicates with the delivery duct, the resilient actuating element being associated with an actuating jack adapted to move the obturator, against the action of the resilient actuating element, into a second position of the obturator in which the compressor is in communication with the cooling means.

BACKGROUND OF THE INVENTION

In known systems of this kind, when the hydraulic or pneumatic pressure of the working fluid supplied to the actuating jack fails for any reason, then, while this jack is set so that the supercharging air is being passed to the cooling means, the jack is no longer able to work against the action of the resilient actuating element (typically a return spring). The latter therefore returns the obturator to its first position, bypassing the cooling means. As a result uncooled supercharging air is fed to the engine, which entails a danger of damage to the engine.

In addition, it is desirable that the supercharging air should not penetrate into the engine at too high a pressure. For this reason, it is possible to take the air through the cooling means so that it loses some of its energy, even when it is no longer necessary to cool it.

DISCUSSION OF THE INVENTION

An object of the invention is to avoid any excessive temperature in the supercharging air in the event of a failure in the supply of working fluid to the actuating jack (or main actuator), and also to avoid any excessive pressure in the supercharging air.

More generally, an object of the invention is to maintain the obturator in its second position, i.e. with cooling when circumstances so require, even if the actuating jack is disabled.

According to the invention, a control device of the kind defined under "Field of the Invention" above is characterised in that the control device includes at least one resilient blocking element associated with a thrust element and with a release jack, the resilient blocking element urging the thrust element towards a first position of the thrust element which can only be reached when the obturator is in its second position, and in which the thrust element prevents the obturator from being returned to its first position, the release jack being adapted to move the thrust element, against the action of the resilient blocking element, into a second position of the thrust element in which the obturator is released for movement.

According to a preferred feature of the invention, the control device further includes means for energizing a release jack, in parallel with de-energization of the actuating jack, when the temperature of the supercharging air is below a predetermined value above which it is required that the air pass through the cooling means. The release jack is then de-energized when the air temperature is above the predetermined value, thus permitting the resilient blocking element, acting as a return spring for the release jack, to return the thrust element to its first position. In the event of failure of the working fluid pressure, the actuating jack is de-energized, and the release jack of course remains de-energized. The thrust element then prevents the resilient actuating element from returning the obturator to its first position.

According to another preferred feature of the invention, the control device further includes means for energizing a release jack, independently of the actuating jack, when the pressure of the supercharging air is below a predetermined value above which it is required that the air pass through the cooling means, regardless of its temperature. When the temperature and pressure of the air are both greater than the changeover threshold values (the predetermined values mentioned above) for the actuating and release jacks, the actuating jack is energized and the release jack de-energized, so that the obturator is immobilized in its second position by the thrust element. A reduction in temperature which is not accompanied by a reduction in pressure then leads to de-energization of the actuating jack, but does not permit return of the obturator to its first position.

The thrust element is preferably mounted at the end of the ram of the release jack.

In a preferred arrangement according to the invention, the axis of the release jack is at right angles to the axis of the actuating jack, with the ram of the latter carrying an engagement element having a side engagement face which extends parallel to the axis of the actuating jack, and a front engagement face which extends parallel to the axis of the release jack, with the front face facing in the direction in which the resilient actuating element acts, the side engagement face coming into facing relationship with the thrust element when the obturator is not in its second position, and the front engagement face coming substantially into contact with the thrust element when the latter is in its first position and the obturator is in its second position, with energization of each of the actuating and release jacks causing the ram of that jack to be retracted.

In such an arrangement, the control device preferably has two release jacks, the axes of which extend in a common direction, the engagement element being U-shaped and having two side engagement faces, each associated with a respective one of the release jacks, the side engagement faces consisting of the external faces of the branches of the U, the free ends of the branches defining front engagement faces for the thrust elements of the two release jacks respectively.

The various features and advantages of the invention will appear more clearly on a reading of the detailed description of a preferred embodiment which follows, and which is given by way of example only and with reference to the accompanying drawings.

DESCRIPTION OF A PREFERRED EMBODIMENT OF THE INVENTION

Figure 5:
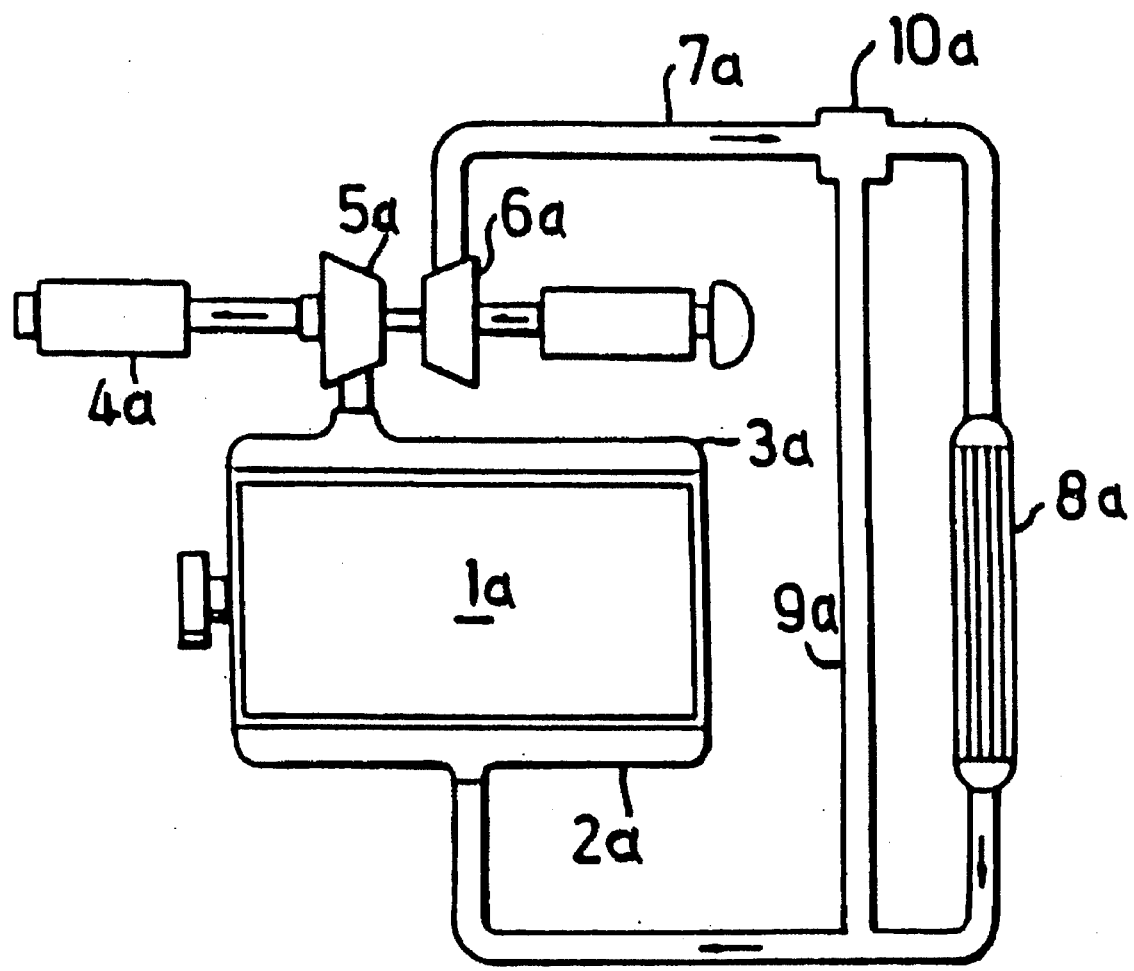
FIG. 5 shows a schematic view of a combustion air system for a turbo-charged engine.

FIG. 5 shows schematically an engine 1a with an intake manifold 2a and an exhaust manifold 3a. The latter is connected to an exhaust pipe with a muffler 4a via a turbine 5a which drives a compressor 6a. A pipe 7a connects, via a charge air cooler 8a, the outlet of the compressor to the intake manifold 2a. Parallel to the cooler 8a there is a shunt pipe 9a, which has at its inlet end a two-way valve 10a. The changeover device shown in the drawings includes, as is known per se, an obturator in the form of a flap valve 1 which is mounted in a changeover valve housing 2 for pivoting movement about a vertical axis 3, so as to lie in a variable, substantially vertical plane. The interior of the housing 2 defines a valve chamber 4, which communicates with the outside via three inlet/outlet connections, namely an inlet connection (not shown) and two outlet connections 5 and 6. The inlet connection receives the heated compressed air from a turbocharger which compresses this supercharging air, while the air is enabled by the control device to leave through the outlet connections 5 and 6 selectively. When the outlet 5 is open, the air can pass through a delivery duct (not shown) which takes the air directly, without being cooled, to the air inlet of the engine. When the outlet 6 is open as in FIG. 1, the air is passed through a cooling radiator before reaching the engine air inlet.

Figure 1:
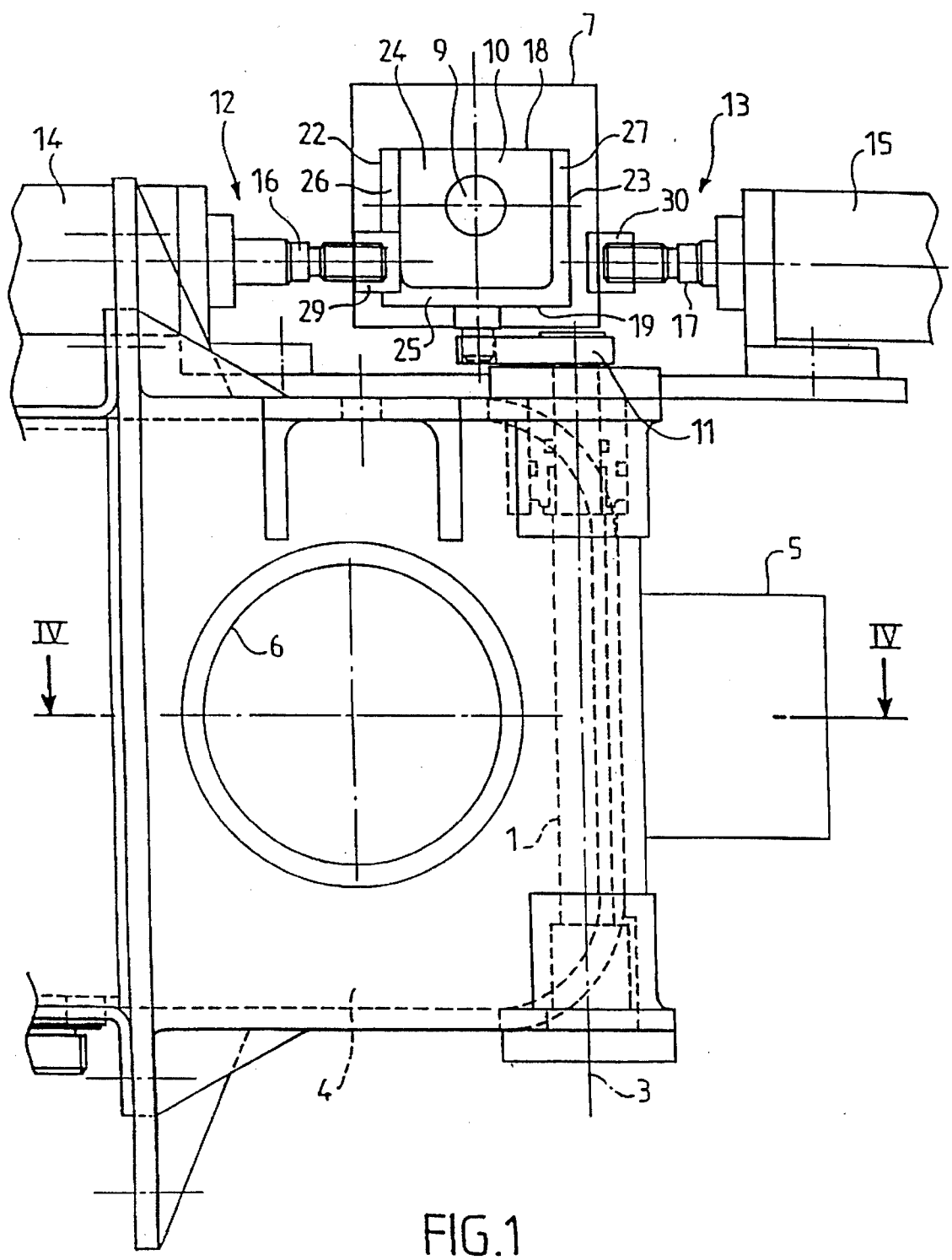
FIG. 1 is a view in elevation showing part of the changeover means comprising a control device in accordance with the invention.
Figure 4:
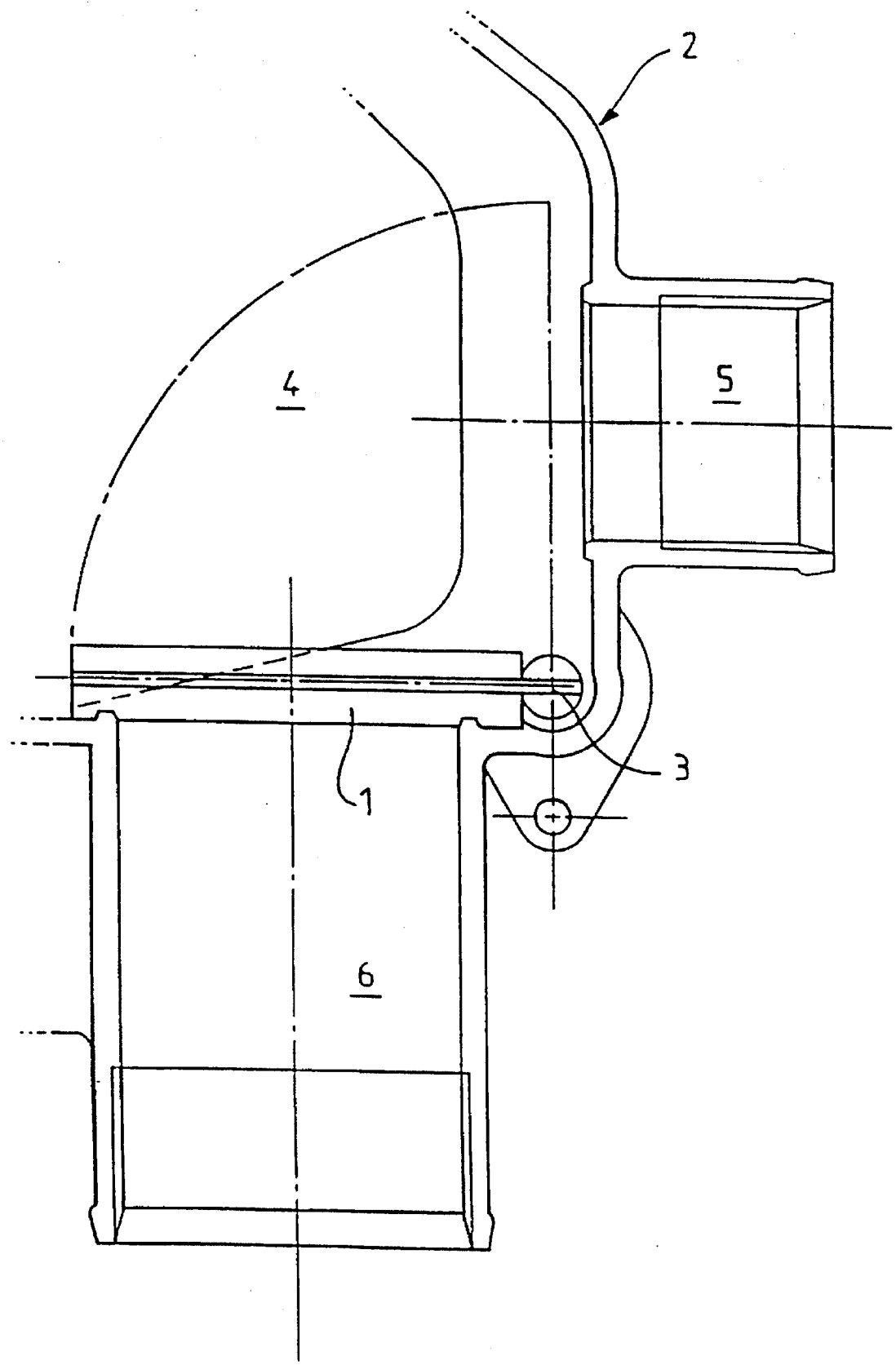
FIG. 4 is a view, seen in cross section taken on the line IV—IV in FIG. 1, for the position of the actuating jack shown in FIG. 3.

The flap valve 1 is arranged to pivot through an angle of 90 degrees between a first position, shown in FIG. 1, in which it obturates the outlet connection 5 and a second position shown in FIG. 4. In the first position of the flap valve 1, all of the supercharging air is compelled to pass through the outlet connection 6 and thence through the cooling radiator, whereas in its second position the valve obturates the outlet connection 6 so that all the air leaves via the outlet connection 5 and is not cooled.

Figure 2:
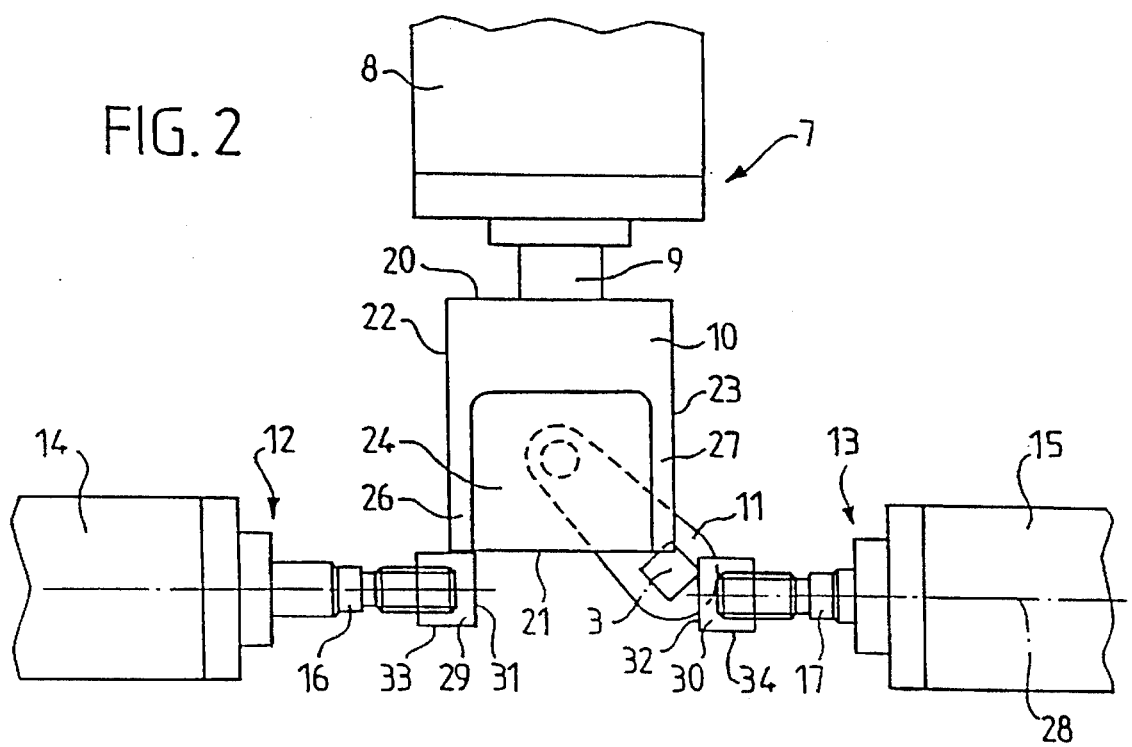
FIG. 2 is a partial top plan view of the same changeover means, in a first position of the actuating and release jacks.
Figure 3:
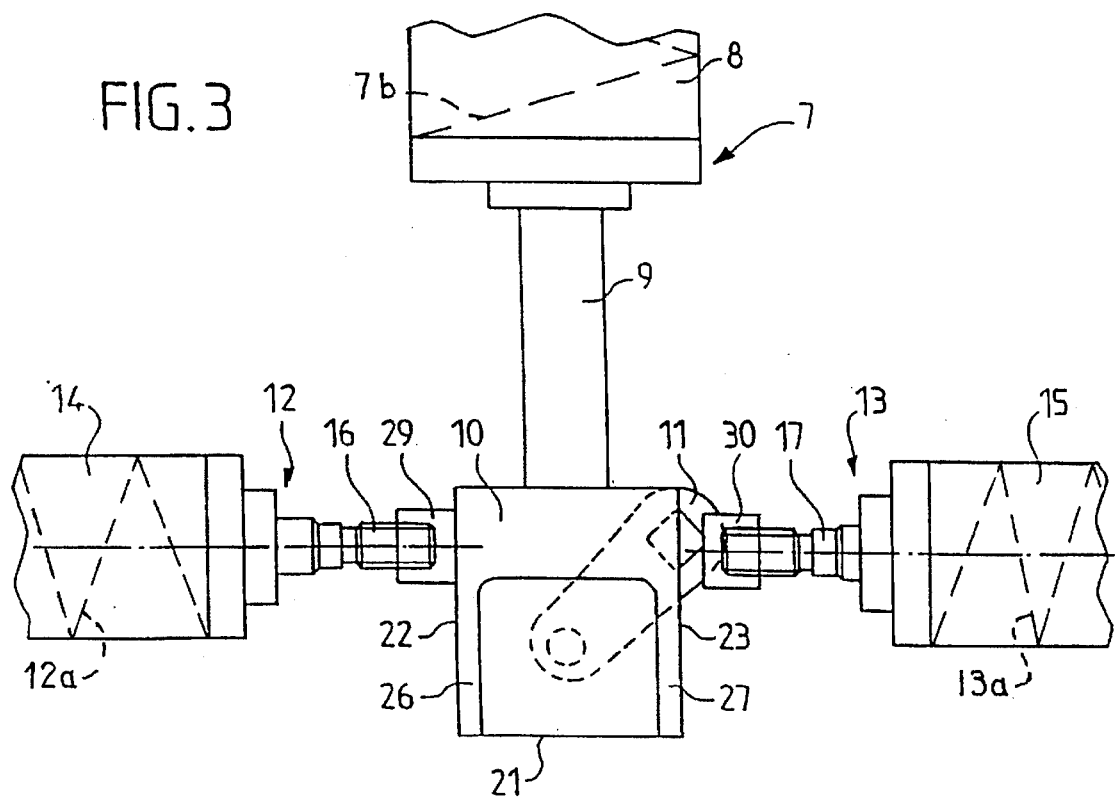
FIG. 3 is a view similar to FIG. 2, in a second position of the actuating and release jacks.

Still in a manner known per se, the flap valve 1 is driven by a pneumatic jack or main actuator 7 which is associated with a return spring 76. The actuator 7 comprises a fixed cylinder 8 and a sliding ram 9; at the free end of the ram 9 there is mounted an engagement element consisting of a stop block or connecting piece 10, which is connected to a horizontal lever 11 fixed to the flap valve 1, in such a way that the latter assumes its first position when the ram 9 is retracted as seen in FIGS. 1 and 2, and its second position when the ram 9 is extended as seen in FIGS. 3 and 4. The ram is in its retracted position when the jack 7 is energized, and the return spring urges the ram towards its extended position.

Two auxiliary or release actuators or jacks 12 and 13 are provided for preventing the ram 9 of the actuating jack 7 from being extended by the associated return spring under predetermined circumstances. The release actuators 12 and 13 are associated with respective springs, referred to here as blocking springs 12a and 13a, respectively, in the drawings. The return spring associated with the actuating jack 7 will be referred to as the actuating spring.

Each of the jacks 12 and 13 is in the form of a pneumatic actuator comprising a cylinder, 14 and 15 respectively, and a ram 16 and 17 respectively. The rams 16 and 17 cooperate with the stop block 10, which has a particular configuration for this purpose. The stop block 10 has a form which is generally that of a rectangular parallelepiped, with a horizontal upper face 18 and an opposed, horizontal lower face 19, together with a rear face 20 which faces towards the cylinder 8 of the actuating jack 7, a front face 21 opposed to the rear face 20, and two side faces 22 and 23. The faces 20 to 23 are vertical. The stop block 10 is generally U-shaped, having a wide opening 24 which is open in its upper face 18 and side face 23. Between the opening 24 and the faces 19, 22 and 23, the stop block 10 has webs 25, 26 and 27 respectively.

The rams 16 and 17 of the release jacks 12 and 13 have a common horizontal axis 28 which is at right angles to the horizontal axis of the ram 9 of the actuating jack 7. The free ends of the rams 16 and 17 are in opposed relationship to each other as shown. Thrust pieces 29 and 30 are fixed to these free ends of the rams 16 and 17 respectively. Each thrust piece 29, 30 is in the general form of a cylinder of revolution and has a flat front face 31, 32 respectively, and a cylindrical side face 33, 34 respectively.

The ram 17 of the release jack 13 is shown in FIGS. 1 to 3 in its retracted position. In this position, the corresponding thrust piece 30 is retracted away from the plane that contains the side face 23 of the connecting piece 10 which faces towards the body 15 of the release jack 13. The ram 9 of the actuating jack 7 can then pass from its retracted position (FIGS. 1 and 2) to its extended position (FIG. 3), and the displacement of the connecting piece 10 is not hindered by the thrust piece 30.

Similarly, with reference to FIGS. 1 and 2, the ram 16 of the other release jack 12 is in its extended position, and the corresponding thrust piece 29 intersects the plane of the side face 22 of the connecting piece 10 which faces towards the body 14 of the jack 12. Therefore, the ram 16 is only able to assume this position when the ram 9 of the actuating jack 7 is retracted. The web, or branch, 26 of the stop block 10 is then in abutment, through the front face 21 of the latter, on the cylindrical side face 33 of the thrust piece 31, thus preventing the actuating ram 9 from being extended. If the ram 16 of the release jack 12 tends to be extended when the actuating ram 9 is itself extended, then the front, or end, face 31 of the associated thrust piece 29 comes into abutment on the side face 22 of the connecting piece 10, and this limits movement of the ram 16 as can be seen in FIG. 3.

Since the connecting piece 10 is symmetrical, the rams 16 and 17 and the thrust pieces 29 and 30 being symmetrical with each other, with respect to the vertical plane that contains the axis of the actuating ram 9, the mode of operation described above for each of the thrust pieces 29 and 30 is equally valid in respect of the other one.

The operation of the changeover device will now be described. The jacks 7, 12 and 13 are controlled by a suitable control means (not shown) in such a way that the following conditions are satisfied:

(1) The rams 9 and 16 of the actuating jack 7 and release jack 12 respectively are withdrawn into their respective cylinders when the temperature of the supercharging air is, respectively, above and below a changeover threshold value which may for example be 50° C. This threshold value is the temperature above which it is required that the supercharging air is to be passed through the cooling radiator.

(2) The ram 17 of the release jack 13 is withdrawn into the actuator body 15 when the pressure of the supercharging air is below a changeover threshold value, which may for example be 1.4 bar, and below which it is required that this air is to be passed through the cooling radiator, regardless of its temperature.

The return spring associated with each jack tends to cause the associated ram to be extended, against the pneumatic action of the jack.

When the engine of the vehicle is at rest, the pressure in the pneumatic supply circuit for the jacks is zero, and the jacks are de-energized. When the engine is started, the pressure necessary for energizing the jacks, which may for example be 5 bar, is established before the temperature and pressure of the supercharging air have reached the above-mentioned values. The rams of the auxiliary (or release) jacks 12 and 13 are therefore in their retracted state, thus enabling the ram 9 of the main (or actuating) jack 7 to be extended by the associated return spring as required.

When the temperature of the supercharging air exceeds its changeover threshold value (e.g. 50° C.), the actuating jack 7 is energized, and the release jack 12 is de-energized, so that the actuating ram 9 is retracted, while the blocking spring associated with the jack 12 displaces the ram 16 of the latter to its extended position. The position is then that which is shown in FIGS. 1 and 2. If, now, there is any failure of pressure in the pneumatic circuit, the actuating jack 7 will be de-energized. However, the thrust piece 31, acting as an abutment for the connecting piece 10, prevents the actuating ram 9 from being extended by the associated actuating spring. Accordingly, the supercharging air will continue to be passed through the cooling radiator.

If the supercharging air pressure exceeds the changeover threshold value of pressure, e.g. 1.4 bar, the other release jack 13 is de-energized so that the corresponding blocking spring displaces the ram 17 to its extended position, which is symmetrical with that shown in FIGS. 1 and 2 for the ram 16. In this position, the thrust piece 30 acts as an abutment to the free end of the web (or branch) 27 of the connecting piece 10. If the temperature of the supercharging air then falls below the changeover threshold value of temperature (e.g. 50° C.), while its pressure remains higher than the threshold value for pressure, e.g. 1.4 bar, then the ram 16 of the release jack 12 will be retracted, but the ram 9 of the actuating jack 7 is prevented by the thrust piece 30 from being moved to its extended position.

In order that the actuating ram 9 can be released once again to its extended position while the engine is running, and in order that the supercharging air can cease being passed through the cooling radiator, both the temperature and the pressure of this air must fall below the corresponding changeover threshold values.

What is claimed is:

1. A temperature control device for supercharging air for a heat engine having an air inlet, a supercharger for compressing said air, a cooler connected with the engine air inlet for cooling said air, a delivery duct connected directly with the engine air inlet and bypassing said cooler, changeover means, and means connecting the latter with the supercharger for delivering said air to the changeover means from the supercharger, said changeover means having two outlet means connected to said cooler and delivery duct respectively, the changeover means including said control device for directing said air, selectively according to the temperature of the air, to the cooling means and the delivery duct, the control device comprising:

an obturator for selectively closing said two outlet means; means mounting the obturator for movement between a first and a second position thereof to put the compressor into communication with the delivery duct and the cooler respectively; resilient actuating means coupled with the obturator for moving the obturator to said first position; and an actuating jack coupled with the obturator for moving the obturator to said second position against the action of said resilient actuating means, wherein the control device further includes: a release jack; a thrust element carried by the release jack for movement thereby from a first position of the thrust element to a second position thereof; a resilient blocking element for said thrust element and release jack for urging the thrust element towards said respective first position, whereby movement of the thrust element into said respective second position is effected by the release jack against the action of said blocking element; and the obturator preventing the thrust element from reaching said respective first position except when the obturator is in the second obturator position, and for preventing the obturator from being returned to the first respective position when the thrust element is in the first thrust element position.

2. A device according to claim 1, further including means for energizing said release jack, in parallel with de-energization of the actuating jack, when the temperature of said air is below a predetermined value above which the air is to be directed to the cooler.

3. A device according to claim 1, further including means for energizing said release jack, independently of the actuating jack, when the pressure of said air is below a predetermined value, above which the air is to be directed to the cooler regardless of its temperature.

4. A device according to claim 1, wherein the release jack includes a ram having a free end, and defining an axis of the release jack, the thrust element being mounted on said free end.

5. A device according to claim 4, wherein the actuating jack comprises a ram defining an axis of the actuating jack, a stop member carried by the actuating jack ram, the stop member having a side face parallel to the actuating jack axis, and a front face parallel to the release jack axis and facing in the direction of said urging action of said resilient blocking element, said side face being oriented so as to be engageable laterally with the thrust element except when the obturator is in its second position, and the front face being disposed to come substantially into contact with the thrust element in the first thrust element position, the device further including means for energizing each jack whereby to retract the corresponding ram.

6. A device according to claim 5 having two said release jacks defining a common axis, the stop member being U-shaped to define two branches each having a free end, the stop member having two side faces, each with a respective one of the release jacks and being an external face of a respective said branch, said free ends of each of said branch defining a front face for engagement with the thrust element of the associated release jack.

* * * * *